(12) United States Patent
Lee et al.

(10) Patent No.: US 7,528,216 B2
(45) Date of Patent: May 5, 2009

(54) TWO STEP PREPARATION OF RANDOM POLYOXADIAZOLE COPOLYMER AND ARTICLES RESULTING THEREFROM

(75) Inventors: Kiu-Seung Lee, Midlothian, VA (US); Harry Lee Smith, Jr., Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 424 days.

(21) Appl. No.: 11/415,026

(22) Filed: May 1, 2006

(65) Prior Publication Data

US 2007/0255035 A1   Nov. 1, 2007

(51) Int. Cl.
 *C08G 63/00* (2006.01)
 *C08G 63/02* (2006.01)

(52) U.S. Cl. .................. 528/272; 264/184; 428/339; 428/375; 521/128; 521/180; 521/183; 522/174; 524/104; 524/173; 528/271; 528/362; 528/363

(58) Field of Classification Search .............. 264/184; 428/339, 375; 521/183, 180, 128; 522/174; 524/104, 173; 528/362, 363, 271, 272
See application file for complete search history.

(56) References Cited

U.S. PATENT DOCUMENTS

| | | | |
|---|---|---|---|
| 3,642,708 A | 2/1972 | Sekiguchi et al. | |
| 3,886,251 A | 5/1975 | Sekiguchi et al. | |
| 4,046,731 A | 9/1977 | Mortimer et al. | |
| 4,115,503 A | 9/1978 | Bach | |
| 4,202,962 A | 5/1980 | Bach | |
| 4,205,038 A | 5/1980 | Brydon | |

FOREIGN PATENT DOCUMENTS

| | | |
|---|---|---|
| DE | 36 20 022 A1 | 12/1987 |
| DE | 296 277 A5 | 11/1991 |
| GB | 1252508 | 11/1971 |
| GB | 1339324 | 12/1973 |
| GB | 1527352 | 10/1978 |

OTHER PUBLICATIONS

IMAI, "Direct Fiber Formation and Fiber Properties of Aromatic Polyoxadiazoles", Journal of Applied Polymer Science, vol. 14, pp. 225-239 (1970).

*Primary Examiner*—Terressa M Boykin

(57) ABSTRACT

In a preparation of random polyoxadiazole copolymer by reaction of a mixture of oleum, hydrazine sulfate, terephthalic acid, and isophthalic acid, the improvement requires the addition of oleum in more than one step.

9 Claims, No Drawings

TWO STEP PREPARATION OF RANDOM POLYOXADIAZOLE COPOLYMER AND ARTICLES RESULTING THEREFROM

BACKGROUND OF THE INVENTION

The present invention is directed to preparation of a polyoxadiazole copolymer and resulting articles.

Imai, *Journal of Applied Polymer Science*, Vol. 14, pp 225-239 (1970) discloses preparation of a random copolyoxadiazole by use of fuming sulfuric acid, terephthalic acid, isophthalic acid, and hydrazine sulfate.

German DE 36 20 022 A1 discloses preparation of polyphenylene-1,3,4-oxadiazole polymers, which are lightly colored or colorless with a low content of hydrazine functional groups.

German DD 296 277A5 discloses preparation of 1,3,4-oxadiazoles by reacting carboxylic acids with hydrazine or hydrazine salts, carboxylic acids with carboxylic acid hydrazides, diacyl hydrazides, dicarboxylic acids, and/or carboxylic acid derivatives with hydrazine and/or hydrazine salts in sulfuric acid and in a condensation agent.

A need is present for an alternate process of preparing a polyoxadiazole copolymer and article resulting therefrom.

SUMMARY OF THE INVENTION

The present invention is directed to a process of preparation of a random copolyoxadiazole polymer by reaction of a mixture of oleum, hydrazine sulfate, terephthalic acid, and isophthalic acid with the oleum added in at least two separate steps.

In a first reaction step, the amount of oleum present with hydrazine sulfate and the terephthalic and isoptalic acids is insufficient to form the final random polyoxadiazole copolymer. Only in a subsequent step is the final amount of oleum added to complete the reaction procedure.

The random polyoxadiazole copolymer formed in a multistep oleum addition preferably has a low solution viscosity at high polymer concentration such as a viscosity range which provides stable extrusion into a resulting article. An example of a viscosity range is 750-2000 poise at a copolymer concentration from 8 to 15 weight percent. It is considered that the resulting copolymer has improved spinning characteristics due to the higher concentration of solids in the spinning solution.

DETAILED DESCRIPTION OF THE INVENTION

In an initial first step an insufficient amount of oleum, i.e. sulfur trioxide ($SO_3$) is present in the reaction mixture calculated on the basis of the remaining components of hydrazine sulfate, terephthalic acid, and isophthalic acid in formation of the polyoxadiazole copolymer. The amount of sulfur trioxide ($SO_3$) from the oleum is present in a first reaction step in an amount not greater than 3 molar equivalents based on the number of moles of hydrazine. Generally, the amount of sulfur trioxide ($SO_3$) is present in a range of 2 molar equivalents to 3 molar equivalents on a basis of the number of moles of hydrazine. In comparison the amount of sulfur trioxide to complete the reaction is generally in the range of 5 to 6 molar equivalents of sulfur trioxide ($SO_3$) based on moles of hydrazine.

The temperature at which the remaining components of hydrazine sulfate, terephthalic acid, and isophthalic acid are mixed to form the reaction solution can vary which in turn will determine the degree of randomness of the final copolymer.

Typically hydrazine sulfate expressed as hydrazine is present in an amount from 95 to 100 mole percent in comparison to the total number of moles of terephthalic acid and isophthalic acid. For environmental reasons an excess of hydrazine is not desirable due to reactivity and environmental toxicity of hydrazine. Other researchers have used an excess of hydrazine to achieve high inherent viscosity with an example being Acta Polymer, 43, 343-347 (1992) FIG. 1.

Typically, the amounts of terephthalic acid and isophthalic acid are present in an amount from 65 to 90 mole percent and 35 to 10 mole percent respectively, based on the total number of moles of the two acids.

The three components of hydrazine sulfate, terephtalic acid, and isoptalic acid typically are combined in solid form and thoroughly mixed prior to the first addition of oleum in an amount not greater than 3 molar equivalents of sulfur trioxide ($SO_3$) based on the moles of hydrazine.

It is preferable to control the temperature of the oleum until all the reagents have dissolved. The temperature preferably should be maintained not greater than 50 degrees Celsius, more preferably, not greater than 35 degrees Celsius. An example of addition and dissolution is at about 25 degrees Celsius over the course of about 10 to 20 minutes. It is believed that by maintaining this temperature that a more random distribution of repeat units is achieved in the final polymer chain which results in improved properties. The more random distribution is in comparison to adding the reagents at an elevated temperature. The difference in the relative rates of dissolution of terephthalic acid and isophthalic acid allow the isophthalic acid to dissolve rapidly and react with the diamine prior to the terephthalic acid dissolving and becoming available to enter into the reaction in significant amounts. The result of this elevated temperature addition is the formation of a block copolymer rather than a random copolymer.

Following dissolution with the four components, the solution typically is heated in a range from 100 to 150 degrees Celsius. Preferably the solution is heated in a range from 110 to 130 degrees Celsius. The solution conventionally is stirred until the viscosity of the solution plateaus. Typically, the viscosity maxima occurs after about 30 to 75 minutes of heating. To this solution is added additional oleum containing about 2 equivalents of $SO_3$ based on the number of moles of hydrazine. Three equivalents of $SO_3$ need to react to complete the reaction. Typically about 5 equivalents are used due to the vapor phase equilibrium of $SO_3$ over the reaction. Typically, the solution is stirred and heated in a range from 100 to 150 degrees Celsius, preferably in a range from 110 to 140 degrees Celsius until a second viscosity plateau is reached. Typically, the second viscosity maxima occurs after about 80 to 150 minutes of heating. The solution then is cooled to room temperature and the polymer precipitated such as by the addition of an excess of water. The copolymer is collected and dried.

Although the above process has been described in two steps, it is understood that it is within the scope of the present invention to employ one or more additional steps. Illustratively rather than a single addition of oleum to complete the copolymer formation in the second step, several additions of oleum may be employed to complete copolymer formation.

To further illustrate the present invention, the following example is provided. All percentages are by weight unless otherwise indicated. In the example, inherent viscosity is expressed as a ratio of the natural logarithm of the relative viscosity to the mass concentration of the polymer as measured with respect to a solution of 0.5 g of the polymer in 100 ml of concentrated sulfuric acid at 25° C. Relative viscosity is a ratio of the viscosity of the polymer in solution to that of the solvent expressed as time of efflux of the solution divided by the time of efflux of the solvent at constant temperature.

EXAMPLE

A polyoxadiazole copolymer was prepared by mixing 22.578 grams (0.1735 moles hydrazine) of solid hydrazine sulfate, 23.004 grams (0.1385 moles) of solid terephthalic acid, and 5.894 grams (0.0355 moles) of solid isophthalic acid were mixed and blended together in a mixer for 30 min. To this blended mixture of solids was added a first addition of 30% Oleum, 115 grams Oleum (0.431 moles of SO3) at 25 degrees Celsius.

The mixture was mechanically stirred at 25 degrees Celsius for 15 minutes to dissolve the solids and form a solution. The solution was then heated to 120 degrees Celsius with mechanical stirring until a constant torque (constant viscosity) was observed on the mixer (60 minutes).

To this solution was added a second addition of 30% Oleum, 93 grams oleum (0.35 moles of SO3) at 130 degrees Celsius. The temperature was maintained at 130 degrees Celsius for 2 hours until the viscosity of the solution reached a plateau. The solution was then cooled to room temperature.

A small sample was removed from the cooled solution and added to water at 0 degrees Celsius to precipitate the polymer. The polymer was washed with water until a neutral pH was reached. The polymer was dried under vacuum and an inherent viscosity of 3.05 measured.

What is claimed is:

1. In a process for preparing a random copolyoxadiazole from a mixture containing oleum, hydrazine sulfate, terephthalic acid, and isophthalic acid wherein the improvement comprises oleum addition in more than one step, comprising:
   (a) combining oleum, hydrazine sulfate, terephthalic acid and isophthalic acid to form a solution wherein sulfur trioxide from the oleum is present in an amount not greater than 3 molar equivalents based on the number of moles of hydrazine and wherein viscosity of the solution plateaus;
   (b) a further addition of oleum to complete a reaction to prepare the random copolyoxadiazole.

2. The process of claim 1 wherein said amount of sulfur trioxide is in a range from 2 to 3 molar equivalents.

3. The process of claim 1 wherein the total amount of sulfur trioxide is in a range from 5 to 6 molar equivalents based on the moles of hydrazine.

4. The process of claim 1 wherein hydrazine sulfate expressed as hydrazine is present in an amount from 95 to 100 mole percent in comparison to a total number of moles of terepthalic acid and isopthalic acid.

5. The process of claim 1 wherein terepthalic acid and isopthalic acid are present in an amount from 65 to 90 mole percent and 35 to 10 mole percent respectively.

6. The process of claim 1 with an oleum temperature not greater than 50 degrees Celsius during dissolution of the oleum, hydrazine sulfate terepthalic acid and isopthalic acid.

7. The process of claim 6 with a solution temperature in a range from 100 to 150 degrees Celsius following dissolution.

8. The process of claim 1 wherein oleum is added in more than two steps.

9. The process of claim 1 wherein viscosity maxima occurs after about 30 to 75 minutes of heating.

* * * * *